United States Patent Office 3,188,260
Patented June 8, 1965

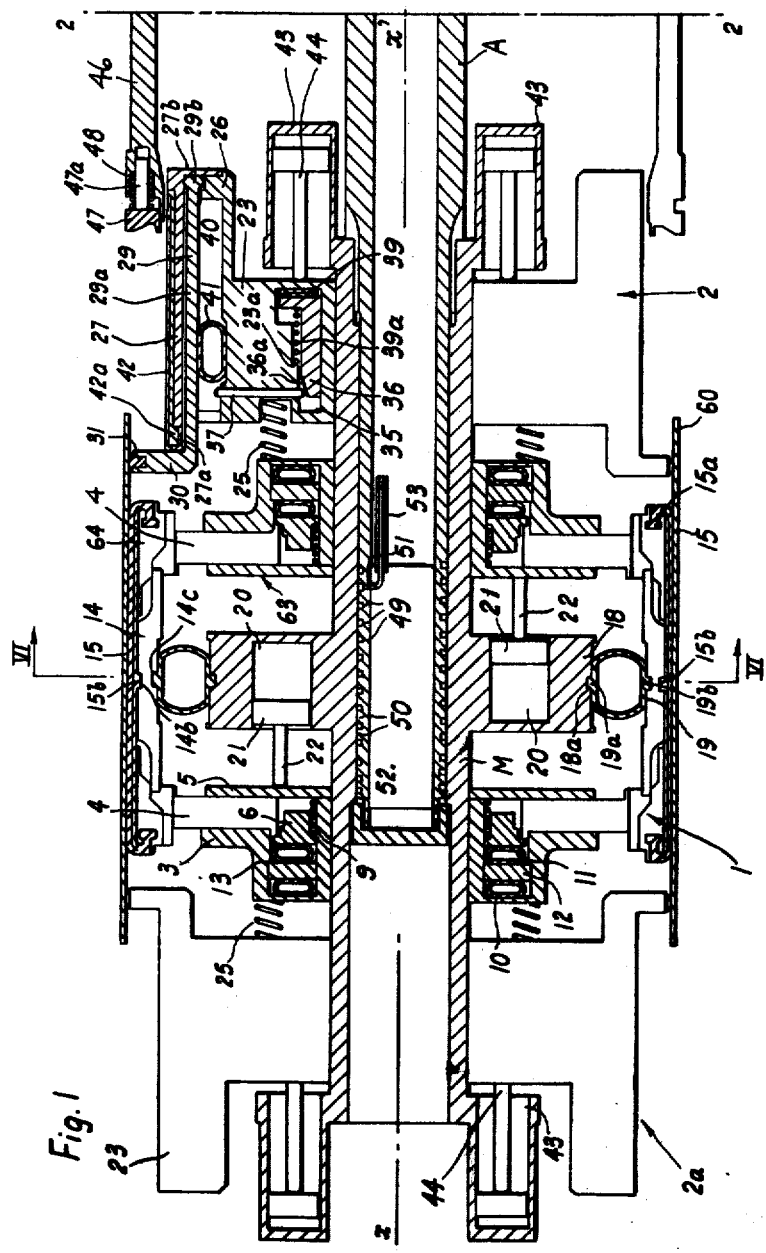

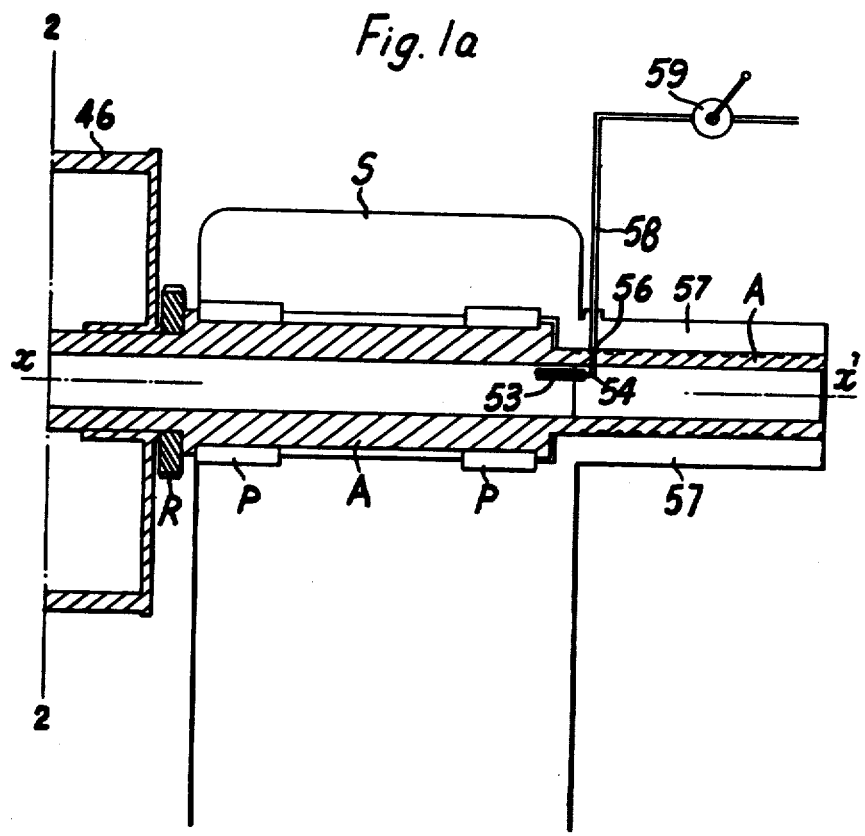

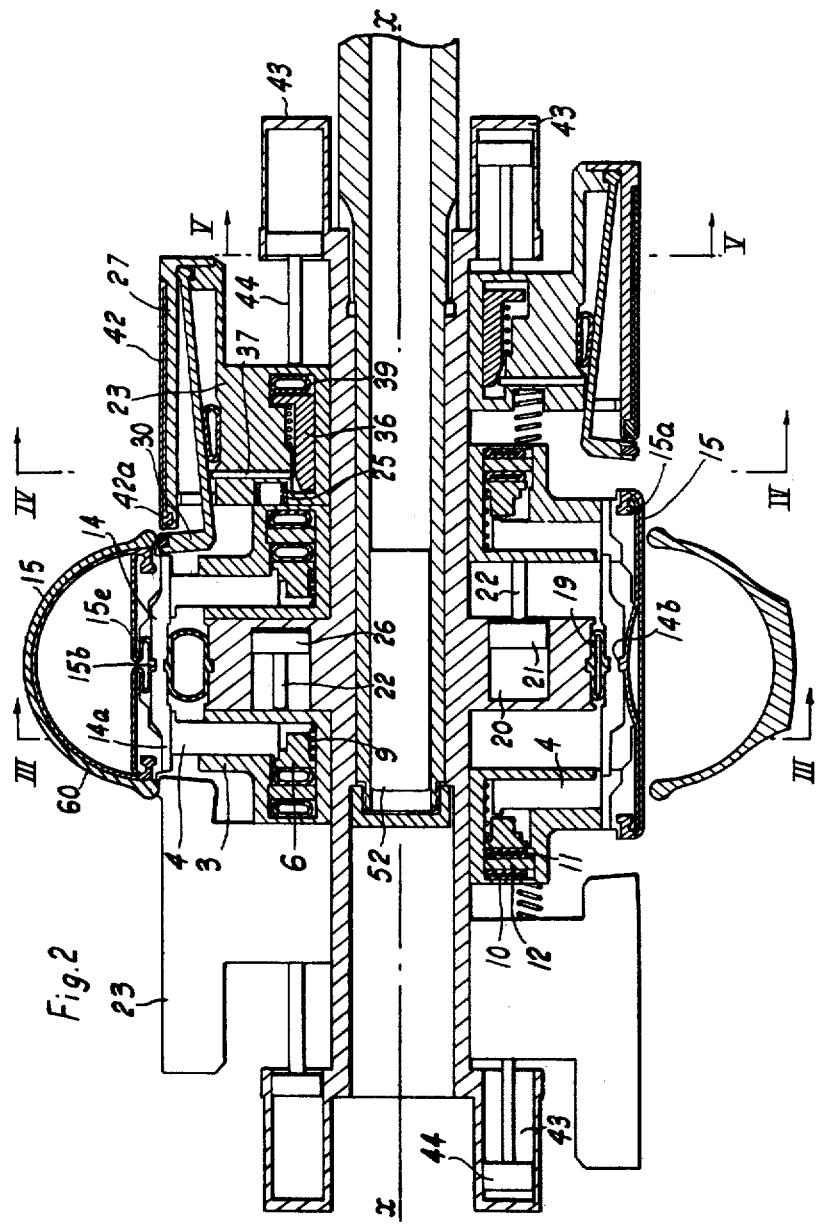

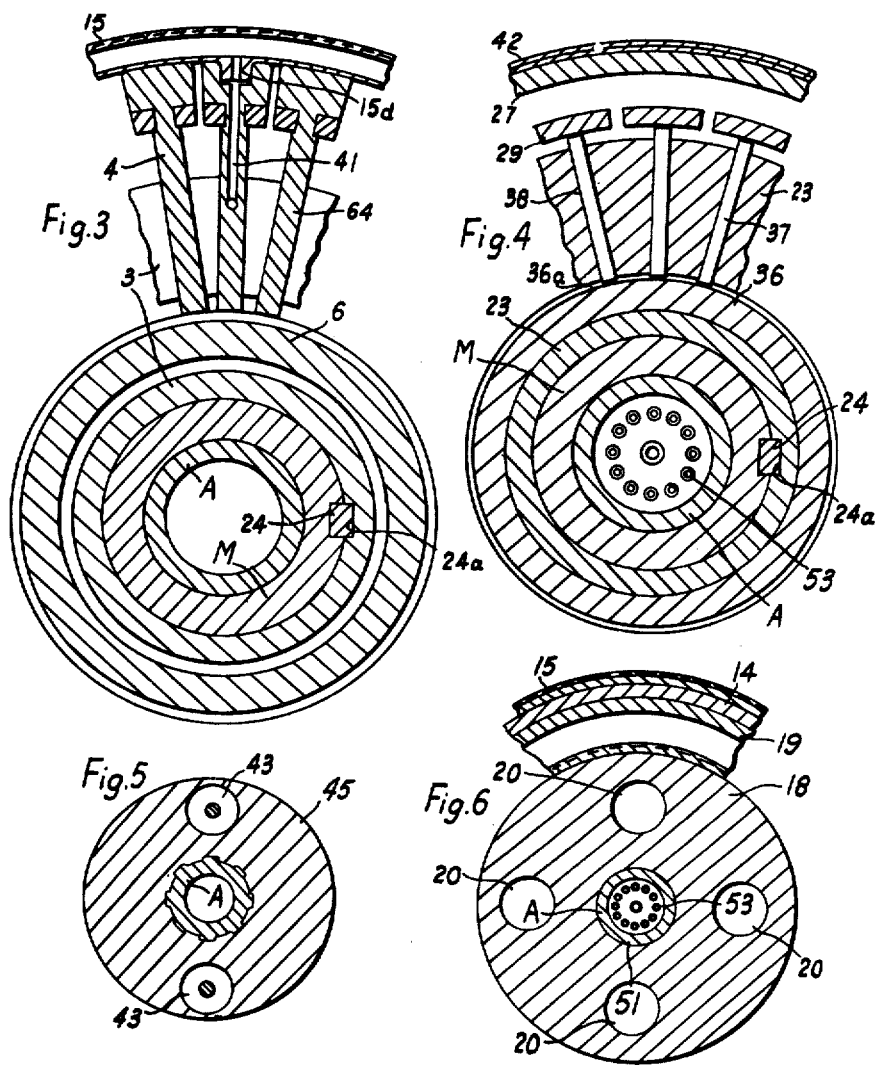

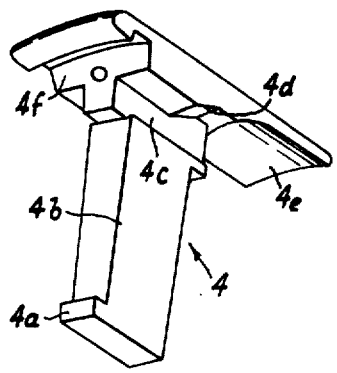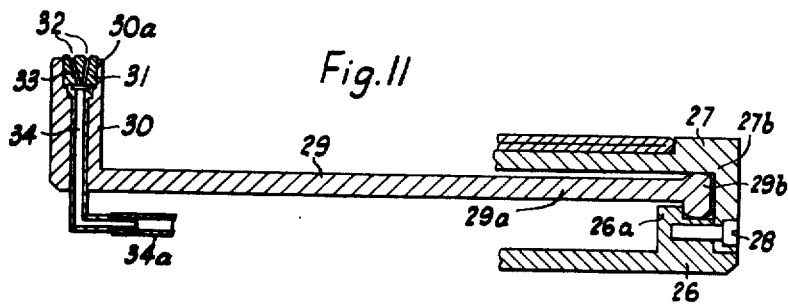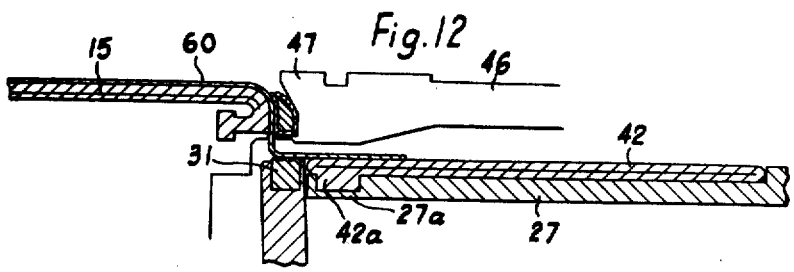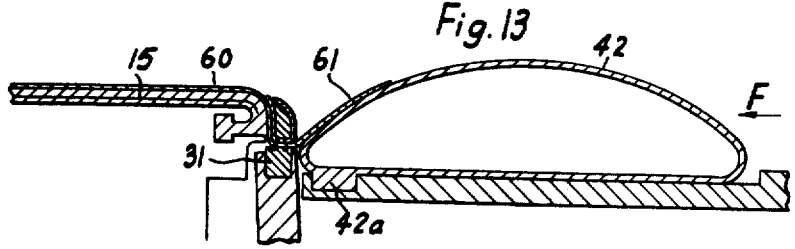

3,188,260
APPARATUS FOR MANUFACTURE OF
PNEUMATIC TIRES
Noel Nebout, Montlucon, France, assignor to Dunlop
Rubber Company Limited, London, England, a British
company
Filed July 3, 1962, Ser. No. 207,225
Claims priority, application France, July 4, 1961,
866,947
13 Claims. (Cl. 156—415)

This invention relates to improvements in apparatus for the manufacture of pneumatic tires.

According to the invention apparatus for the manufacture of pneumatic tires comprises a tire building former provided at each of its ends with a ply-turn-down and bead-supporting device, said device being radially adjustable and movable axially between a first position for engaging, prior to a turning operation, the radially innermost surfaces of the ends of a ply of a tire carcass mounted upon the former and extending beyond the ends thereof, and a second position for supporting the base of a bead of the tire carcass.

Preferably. each of said devices comprises a plurality of axially extending arms disposed in spaced relationship around the axis of the former, and a resilient extensible annular ply and bead engaging member mounted around the arms in a position adjacent to the former. The annular member is provided with a plurality of passageways extending from its outer peripheral surface for connection to a means for reducing below the ambient atmospheric pressure, the air pressure between that surface and the plies of a carcass during a ply-turn-down operation.

Preferably also, the arms of each device are pivotally mounted in a position axially outwardly of the annular member for pivotal movement of the arms in a radial direction to effect expansion of the annular member. Means are povided for expanding the annular member into a position for engagement with the plies of a carcass prior to a ply-turning operation, means also being provided for expanding the annular member coaxially with respect to the former into a bead supporting position.

The invention also includes a pneumatic tire made with the above apparatus.

One embodiment of the invention will now be described by way of example, with reference to the accompanying drawings in which:

FIGURE 1 is an axial cross-sectional view of part of a tire building apparatus according to the invention showing one position of the apparatus during the manufacture of a pneumatic tire, parts of the apparatus being shown in detail and the remainder in outline only;

FIGURE 1a is a continuation of the apparatus shown in FIGURE 1 to the right-hand side of the line 2—2 in FIGURE 1;

FIGURE 2 is a section similar to FIGURE 1 showing two further positions of the apparatus during the manufacture of a pneumatic tire;

FIGURES 3, 4 and 5 are partial sections of the apparatus, respectively along lines III—III, IV—IV and V—V in FIGURE 2;

FIGURE 6 is a partial section of the apparatus along line VI—VI in FIGURE 1;

FIGURE 10 is an isometric view of a part of the building drum.

FIGURE 11 is an axial cross-section showing in detail a part of a ply turn down and bead seating device forming a part of the apparatus;

FIGURES 12 and 13 are axial cross-sectional views showing different positions of part of the ply-turn-down and bead-seating device during the manufacture of a tire.

Figure 7:
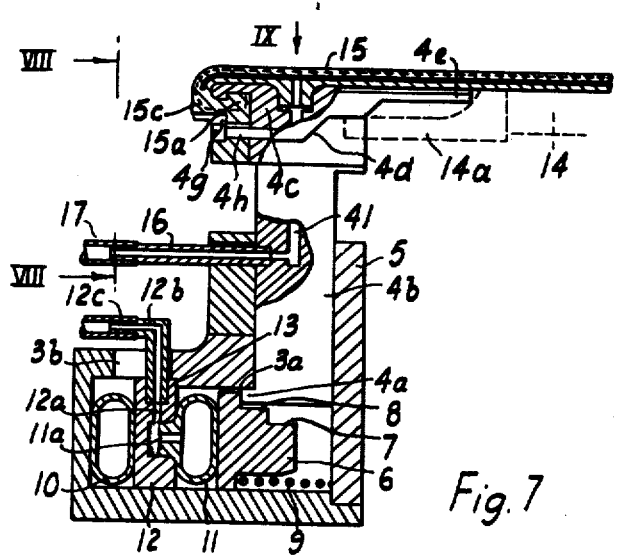
FIGURE 7 is an enlarged axial view showing in greater detail one end of a tire building drum forming a part of the apparatus.

As shown in FIGURE 1, apparatus for manufacturing a pneumatic tire briefly comprises a tire building former 1 and two subsidiary assemblies 2 and 2a, positioned coaxially one at each end of the former. The former and the two assemblies are slidably mounted upon a sleeve M secured to a hollow shaft A which is rotatably mounted at one end in bearings P (see FIGURE 1a) on a pedestal S, the former and the assemblies being rotatable by means of a sprocket R secured to the shaft A, the sprocket R being drivably connected to an electric motor (not shown).

The apparatus will now be described in more detail.

The former 1 comprises a substantially cylindrical inflatable bag 15, forming the tire building surface of the former, and a bag support member 63 which has a cylindrical outer peripheral surface and supports substantially the whole of the bag 15 in its uninflated condition as shown in FIGURE 1.

The support member comprises a plurality of separate radially movable segments 64 which are positioned in end to end relationship circumferentially of the support member. Each segment 64 comprises three separate portions, a central portion 14 and two end portions 4 disposed one at each end of the central portion. As shown in FIGURE 10, each end portion comprises an axially extending part 4e for supporting the bag 15 and a radially inwardly extending spoke 4b. Each end portion is provided at its axially outer end with a groove 4f for receiving an end 15a of the bag, the bag being secured within the groove by a wedge member 4g (FIGURES 7 and 8) secured to the end portion by a screw 4h. The bag 15 is inflatable through a passageway 41 extending through one of the spokes 4b (FIGURES 7 and 8), the passageway being connected to one of the grooves 49 through a rigid tube 16 and a flexible tube 17.

Figure 9:
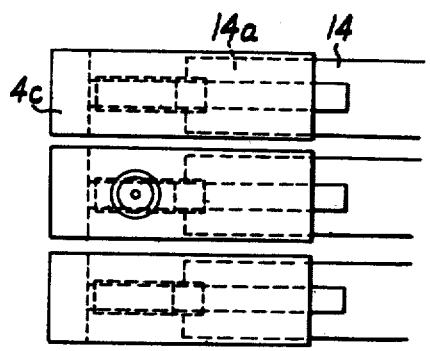
FIGURE 9 is a view of part of the apparatus in the direction of arrow IX in FIGURE 7.

Each central portion 14 is provided at each end with a forked end 14a (see FIGURES 7 and 9) which lies radially within the axially inner end of the part 4e of the adjacent end portion, and is slidably mounted upon a narrow neck 4c of the end portion.

The radially outer surface of each forked end 14a lies in engagement with the opposing radially inner surface of the part 4e of the end portion, this inner surface being formed with a sloping portion 4d which, in the assembled state of the support member, extends radially inwardly as it extends axially outwardly. This sloping portion provides a means for moving the central portion radially inwardly as will be described.

Each central portion 14 is provided with a circumferentially extending groove 14b (FIGURES 1 and 2) received within which is a circumferential rib 15b formed on the inner peripheral surface of the tube 15.

An inflatable bag 19 is positioned radially within the central portions 14 for expanding the segments 64, the bag being supported upon a cylindrical member 18 integrally formed with the sleeve M. The bag 19 is provided with two circumferential ribs 19a and 19b which lie, respectively, within grooves 18a and 14c formed, respectively, in the member 18 and the central portions 14 of the support member.

Figure 8:
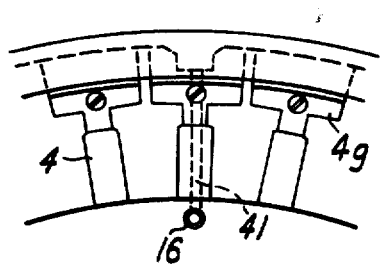
FIGURE 8 is a view on line VIII—VIII of a part of the apparatus shown in FIGURE 7.

The end portions 4 of the segments 64 are slidably mounted for radial movement by means of their spokes 4b within radial groove in each of two rings 3, slidably mounted upon the sleeve M one on each side of the member 18, the rings 3 being movable axially outwardly symmetrically with respect to median plane of the former by means of four pneumatic cylinders 20, formed within the member 18, and pistons 21, the piston rods 22 of which lie in abutting engagement with the discs 5. The rings 3 are prevented from rotational movement upon sleeve M by keys 24 (see FIG. 4) secured upon the sleeve and slidably mounted in keyways 24a provided in the rings. As is particularly shown in FIGURE 7, the spokes 4b are retained in position in the respective rings 3 by a disc 5 secured to each of the rings. A heel 4a FIG. 7 provided on the radially inner end of each spoke is engageable with a surface 3a of the ring.

The end portions 4 are supported at the radially inner ends of the spokes 4b, within each ring 3, by means of a stepped ring 6 FIGS. 2 and 7 which is provided on its outer peripheral surface with two annular steps 7 and 8 for engagement by the ends of the spokes, the ring 6 together with the bag 19 forming means for adjusting the radial position of the segments as will be described. The ring 6 is movable axially inwardly within the ring 3 by means of two inflatable bags 10 and 11 separated by a ring 12, the axial displacement of which is limited by a shoulder 13 formed on the ring 3. Passageways 12a connected at one end by passageways 11a (only one of which is shown) to the tubes 10 and 11 are connected to one of the grooves 49 shown in FIG. 1 of shaft A for inflating the bags by a flexible tube 12c and a rigid tube 12b passing through a slot 3b of the ring 3. A spring 9 located between the ring 6 and the disc 5 co-axially with the hollow shaft A is provided to move the ring 6 in an axially outward direction.

As the subsidiary assemblies 2 and 2a are identical in construction, the assembly 2 only will now be described.

The assembly 2 comprises a framework 23 slidably mounted upon the sleeve M, a key 24 (FIGURE 4) provided upon the sleeve and received within a keyway 24a in the framework preventing relative rotation between the framework. The framework and the sleeve 1 is separated from the adjacent ring 3 by a plurality of axially extending compression springs 25 and is movable axially inwardly by means of two pneumatic cylinders 43 and pistons 44, the cylinders being formed on a disc 45 (see FIG. 5) formed integrally with the end of the sleeve M, the ends of the piston rods being in engagement with the framework 23.

A ply-turn-down and bead-seating device is mounted upon the framework 23. This device comprises a set of spaced-apart arms 29 FIGS. 2, 4 and 1 positioned around the framework on a pitch circle the centre of which coincides with the centre of rotation of the former, each arm being L-shaped and comprising an axially extending portion 29a terminating at its end nearest the former in a radially outwardly extending portion 30. Each arm is pivotally mounted at its axially outermost end by means of a knuckle 29b (see particularly FIGURE 11) formed integrally with the arm, the knuckles being mounted within an annular space defined between an annular flange 26 formed on the framework and a radially inwardly extending flange 27b of a cylindrical member 27 which surrounds the arms and is secured to the arms by screws 28. The knuckle is retained in position by a radial extension 26a of the flange 26. A resilient rubber ring 31, forming a radially adjustable supporting member for supporting and turning down the ends of plies and for supporting the bead region of a tire, surrounds the portions 30 of the set of arms 29, the ring being received within channels 30a provided at the ends of the portions 30 (see FIG. 11), the arms forming part of a moving means for moving the ring as will be described. The outer peripheral surface of the ring 31 is a securing surface provided with two annular grooves 32, a plurality of passageways 33 extending from the grooves and connected to a tube 34 and a flexible pipe 34a, being provided for connection to means for reducing, below the ambient atmospheric pressure, the pressure between that surface of the ring and the plies of a carcass during a ply turn down operation.

Means are provided for expanding the ring into a position for engagement with the plies of a carcass prior to a ply-turn-down operation, such means comprising an inflatable annular rubber bag 41 contained within an annular recess, coaxial with the axis of the shaft A, formed between the arms 29 and the framework 23. Means are also provided for expanding the rubber ring 31, coaxially with respect to the former into a bead supporting position, this means comprising a plurality of radially-outwardly-extending pins 37 (see FIGURES 1, 2 and 4), one for each of the arms 29, the pins being slidably mounted in guides 38 provided in the framework 23. The radially outer end of each pin is engageable with the radially inner surface of an associated arm 29, the radially inner end of the pins lying in engagement with a frusto conical outer peripheral surface 36a formed on a ring 36, axially slidably mounted within an annular chamber 35, formed within the framework. The ring 36 is movable in an axially inward direction by an inflatable annular bag 39 contained within the chamber between the axially outermost end of the chamber and the ring. A compression spring 39a coaxial with the axis of the shaft A is located between the ring 36 and a shoulder 23a of the framework for urging the ring in an axially outward direction.

Supported upon the outer peripheral surface of the cylindrical member 27 is an inflatable cylindrical bag 42 which is used for turning the ends of the plies of a carcass around a bead wire, as will be described, the bag being held in position by means of a thickened portion 42a of the bag, received within an annular recess 27a of the member 27.

The inflatable bags described above are connected to a plurality of circumferentially extending grooves 49 in the shaft A (FIGURE 1), one bag to each groove, for inflating the bags, the grooves being air-tightly sealed from one another by engagement of portions 50 of the shaft with the inner peripheral surface of the sleeve M. The end of the shaft A shown in FIGURE 1a is provided with a plurality of circumferentially extending grooves 56, equal in number to the grooves 49. A plurality of tubes 53 (FIGURES 4 and 6) extend along the shaft A and connect the grooves 49 to the grooves 56, each groove 49 to one of the grooves 56. Each tube 53 (see FIGURES 1 and 1a wherein only one tube is shown) is connected, respectively, by a passageway 51 and a passageway 54 to its associated grooves 49 and 56. As shown in FIGURE 1a, each groove 56 is connected by a pipe 58 (one only of which is shown) controlled by a valve 59, to a source of compressed air for inflating its associated bag.

A cylindrical cage 46 (see FIGURE 1a) is slidably mounted at one end of the former upon the shaft A. A similar cage, not shown, is detachably mounted at the other end of the former. Each cage 46 carries at its axially inner most end that is, the end extending toward the former a bead wire carrying ring 47 (see FIGURE 1), slidably mounted upon the cage and captive thereto by means of a plurality of pins 47a, each pin being urged axially away from the cage by a spring 48.

The apparatus described above is operated as follows:
Initially, a bead wire is positioned on each ring 47 and as shown in FIGURE 1, the inflatable bags 15, 39 and 42 are deflated and the bags 10, 11, 19 and 41 are inflated, the pistons 21 are in their outermost positions and pistons 44 are in their innermost position within their cylinders. The building former is in a cylindrical condition and the rings 31 of the ply-turn-down and bead-seating device are in expanded positions for engaging and supporting the ends of plies of a tire carcass to be built upon the former. The spokes 4b of segmnts 64 are supported upon steps 8 of the rings 6 so that the diameter of the former is set at the largest of the two tire building diameters.

The plies 60 of a tire carcass are placed in cylindrical condition around the former with the ends of the plies overlying and in engagement with the rubber rings 31. The air pressure within the grooves 32 of the rings is then reduced below ambient atmospheric pressure to hold the ends of the plies to the rings, and the bags 41 are then deflated simultaneously with the admission of air under pressure into the cylinders 43 to move the pistons outwardly of the cylinders. The rubber rings are then allowed to contract so pivoting the arms 29 inwardly, the arms being moved upon the assemblies 2 and 2a axially inwardly by the pistons 44 to turn the ends of the plies down over the ends of the former. The position of the rubber ring 31 and the plies 60 after ply-turn-down is shown in FIGURE 12.

The bead wires are then located on the turned down plies, one bead wire at each end of the former, by axially inward movement of the cages 46. The grooves 32 of the rings 31 are then disconnected from the means for reducing the pressure within the grooves, and the arms 29 and rings 31 are moved radially outwardly, by pins 37 actuated by inflating the bags 39, to a position in which the rings support the beads and consolidate the ends of the plies to the bases of the beads (FIGURE 13). The bags 42 are then inflated and are rolled axially across the ends of the former by a force applied to the bags in the direction of arrow F, see FIGURE 13, to turn the ends 61 of the plies 41 over the bead wires. The bags 42 are then removed axially from the former and deflated.

A tread and rigid breaker assembly (not shown) is then positioned coaxially around the cylindrical carcass thus produced, and is located symmetrically with respect to the median plane of the carcass.

The carcass is then formed into a toroidal shape and into engagement with the tread and breaker assembly by inflation of the bag 15, the beads of the carcass being moved towards each other by actuation of the pneumatic cylinders 20 and 43 and pistons 21 and 44 to move the portions 4 of the segments 64 and the assemblies 2 and 2a symmetrically towards each other.

During axial inward movement together of the end portions 4, the central portions 14 of the segments 64 are moved radially inwardly by the sliding engagement of the sloping portions 4d of the end portions with the forked ends 14a of the central portions. The position of the parts of the apparatus after inflation of the carcass is illustrated in the upper part of FIGURE 2.

After consolidation of the tread and breaker to the carcass and after completion of the carcass, the former is collapsed as shown in the lower part of FIGURE 2 by deflation of the bags 10, 11 and 19 and by actuation of the pneumatic cylinders and pistons to move the ends of the former and the assemblies 2 and 2a axially away from one another. The completed carcass may then be removed.

The former may then be expanded up to either of two tire building diameters, for the manufacture of a succeeding tire, by inflation of the bag 19 to move the segments 64 radially outwardly, and by inflating the bags 10 and 11 to move the rings 6 axially to a position in which the rods 4b of the segments are supported either on the step 7 or the step 8 of the ring.

Having now described my invention, what I claim is:

1. Apparatus for the manufacture of pneumatic tires comprising a tire building former having a tire building surface, a ply-turn-down and bead-supporting device at each end of said former each of which comprises at least one axially and radially adjustable supporting member having a securing surface both for securing engagement with the inner peripheral surface of an end of a ply extending over the end of the former and for supporting a bead region of a tire carcass located on the former, and moving means operably connected to said member to effect, upon operation of said means, a radial and axial inward ply-turn-down movement of the member from a first position, in which said surface of the member is located at substantially the diameter of the tire building surface of the former, to a second position in which the surface of the member is located adjacent the end of the former to support a bead wire.

2. An axially collapsible tire building and shaping former comprising an inflatable bag, the outer peripheral surface of which forms the tire building surface, a bag support member located radially within the inflatable bag, said support member comprising a plurality of separate segments positioned circumferentially of the support member in end-to-end relationsihp, each segment being formed from at least one central portion and two end portions which, in a substantially cylindrical condition of the former, lie in axial side-by-side relationship, and segment portion moving means associated with the portions of the segment to move said central portion radially relative to said end portions and to move said end portions towards each other into positions in which each end portion and the central portion lie relatively in overlapping relationship one with the other.

3. Apparatus according to claim 1 comprising a framework at each end of the former and wherein the supporting member at each end of the former is a resiliently extensible annular member, the outer peripheral surface of which is said securing surface for securing engagement with the end of the ply and for supporting the bead wire, the annular member being formed with at least one passageway extending from said securing surface for connection to means for reducing, below ambient atmospheric pressure, the air pressure between said securing surface and the ply to secure the ply to the surface during a ply-turn-down operation, and the moving means comprises a plurality of axially-extending arms in supporting engagement with the annular member and in spaced relationship around the axis of the former.

4. Apparatus according to claim 1 wherein the tire building former comprises an inflatable ply supporting member, the outer peripheral surface of which forms the tire building surface, and a support member for the inflatable member, said support member having a cylindrical outer peripheral surface which is disposed radially within the inflatable member.

5. Apparatus according to claim 4 wherein the support member comprises a plurality of separate segments positioned circumferentially of the support member in end to end relationship, means being provided for adjusting the radial disposition of the segments to position the tire building surface of the diaphragm at any of a plurality of predetermined diameters.

6. Apparatus according to claim 5 wherein the means for adjusting the radial position of the segments comprises an inflatable member located radially inwardly of the segments for expanding the segments and a pair of axially movable coaxial rings disposed one on each side of the median plane of the former, each ring comprising on its outer peripheral surface a plurality of steps for supporting the segments of the supporting member at different diameters.

7. Apparatus according to claim 6 wherein each segment of the support member comprises three separate portions, two end portions disposed one at each end of the former and a central portion located between the end portions, the inflatable member for supporting the segments being disposed radially inwardly of the central portion and the coaxial rings being disposed one radially within each of the end portions of each segment, means being provided for simultaneously moving the end portions of the segments and the subsidiary formers towards each other symmetrically with respect to the median plane of the former and for inflating the ply supporting member to inflate a carcass built in a cylindrical condition on the former into a toroidal shape, and means being provided for moving the central portions of the segments radially inwardly of the former prior to or during movement towards each other of the end members.

8. Apparatus according to claim 7 wherein for each segment of the support member the means for moving the central portion radially inwardly comprises an inclined portion formed on one of the opposing end surfaces between each end member and the central portion, said inclined portion being so disposed that, upon movement towards each other of the end portions, the central portion is caused to move radially inwardly by relative sliding movement between the inclined portions and the surfaces of the central portion upon which they bear.

9. A former according to claim 4 wherein means are provided for adjusting the radial position of the segments to position the tire building surface of the bag at any of a plurality of predetermined diameters, the means comprising an inflatable member located radially inwardly of the segments for expanding the segments, and a pair of axially movable coaxial rings disposed one on each side of the mid-circumferential plane of the former, each ring comprising on its outer peripheral surface a plurality of steps for supporting the segments of the supporting member to position said segments rigidly and for accurate stepwise adjustment at different diameters.

10. A former according to claim 9 wherein the inflatable member for supporting the segments is disposed radially inwardly of the central portion and the coaxial rings are disposed one radially within each of the end portions of each segment, and wherein means are provided, operably connected to the segments and the inflatable bag, to move simultaneously the end portions of the segments towards each other symmetrically with respect to the mid-circumferential plane of the former and to inflate the inflatable ply supporting member to inflate and shape a carcass built in a cylindrical condition on the former into a toroidal shape.

11. A former according to claim 10 wherein the ends of the central portion and the opposed ends of the end portion have opposed surfaces so inclined that upon movement towards each other of the end portions, the central portion is caused to move radially inwardly by relative sliding movement of the inclined surfaces of the end portions upon the inclined surfaces of the central portion.

12. Apparatus according to claim 3 wherein the arms of each of said devices are pivotally mounted upon the framework in a position axially outwardly of the annular member, and said arm moving means comprises a plurality of radially outwardly extending pins in engagement with the arms and slidably mounted within the supporting member in a position radially inwardly of the arms and means for moving the pins radially outwardly coaxially with respect to the former to pivot the arms in a radially outward direction and expand the annular member.

13. Apparatus according to claim 12 wherein said means for moving the pins comprises an axially slidable member provided with a frusto-conical outer peripheral surface for engagement with the radially inner ends of the pins and means for moving the slidable member in each direction to effect radial movement of the pins.

References Cited in the file of this patent

UNITED STATES PATENTS

| | | |
|---|---|---|
| 2,440,662 | Frazier | Apr. 27, 1948 |
| 2,565,071 | Frazier | Aug. 21, 1951 |
| 2,715,931 | Frazier | Aug. 23, 1955 |
| 2,717,628 | Wikle et al. | Sept. 13, 1955 |
| 2,910,110 | Frohlich | Oct. 27, 1959 |
| 2,951,526 | Hasse | Sept. 6, 1960 |
| 3,044,533 | Lowe | July 17, 1962 |
| 3,077,917 | Appleby | Feb. 19, 1963 |
| 3,078,204 | Appleby | Feb. 19, 1963 |
| 3,081,814 | Beckadolph et al. | Mar. 19, 1963 |